(12) United States Patent
Zhu et al.

(10) Patent No.: US 11,709,631 B2
(45) Date of Patent: Jul. 25, 2023

(54) READ-MODIFY-WRITE DATA CONSISTENCY MANAGEMENT

(71) Applicant: Micron Technology, Inc., Boise, ID (US)

(72) Inventors: Fangfang Zhu, San Jose, CA (US); Jiangli Zhu, San Jose, CA (US); Juane Li, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/460,972

(22) Filed: Aug. 30, 2021

(65) Prior Publication Data

US 2023/0064382 A1  Mar. 2, 2023

(51) Int. Cl.
*G06F 3/06* (2006.01)

(52) U.S. Cl.
CPC ............ *G06F 3/0659* (2013.01); *G06F 3/064* (2013.01); *G06F 3/0619* (2013.01); *G06F 3/0679* (2013.01)

(58) Field of Classification Search
CPC ...... G06F 3/0659; G06F 3/0619; G06F 3/064; G06F 3/0679
See application file for complete search history.

(56) References Cited

U.S. PATENT DOCUMENTS

| | | | |
|---|---|---|---|
| 4,843,542 A * | 6/1989 | Dashiell | G06F 12/0833 711/131 |
| 5,432,918 A | 7/1995 | Stamm | |
| 5,745,732 A | 4/1998 | Cherukuri | |
| 5,774,643 A * | 6/1998 | Lubbers | G11B 20/1833 714/766 |
| 6,728,792 B2 * | 4/2004 | Wagner | G06F 9/4881 711/158 |
| 9,864,546 B1 * | 1/2018 | Kovishaner | G06F 3/0604 |
| 2006/0136659 A1 | 6/2006 | Jain | |
| 2009/0327614 A1 | 12/2009 | Shinkar | |
| 2013/0318283 A1 | 11/2013 | Small | |
| 2014/0089592 A1 | 3/2014 | Biswas | |

(Continued)

OTHER PUBLICATIONS

USPTO, Office Action for U.S. Appl. No. 17/460,828, dated Dec. 8, 2022.

*Primary Examiner* — David Yi
*Assistant Examiner* — Dustin B. Fulford
(74) *Attorney, Agent, or Firm* — Lowenstein Sandler LLP

(57) ABSTRACT

A system includes a processing device, operatively coupled with a memory device, to perform operations including receiving a media access operation command designating a first memory location, and determining whether a first media access operation command designating the first memory location and a second media access operation designating a second memory location are synchronized, after determining that the first and second media access operation commands are not synchronized, determining that the media access operation command is an error flow recovery (ERF) read command, in response to determining that the media access operation command is an ERF read command, determining whether a head command of the first queue is blocked from execution, and in response to determining that the head command is unblocked from execution, servicing the ERF read command from a media buffer maintaining previously written ERF data.

20 Claims, 13 Drawing Sheets

(56) References Cited

U.S. PATENT DOCUMENTS

| | | | |
|---|---|---|---|
| 2017/0123921 A1* | 5/2017 | Ptak | G06F 3/0689 |
| 2019/0121577 A1 | 4/2019 | Mazumder | |
| 2019/0317693 A1 | 10/2019 | La Fratta | |
| 2020/0379684 A1 | 12/2020 | Subbarao | |

* cited by examiner

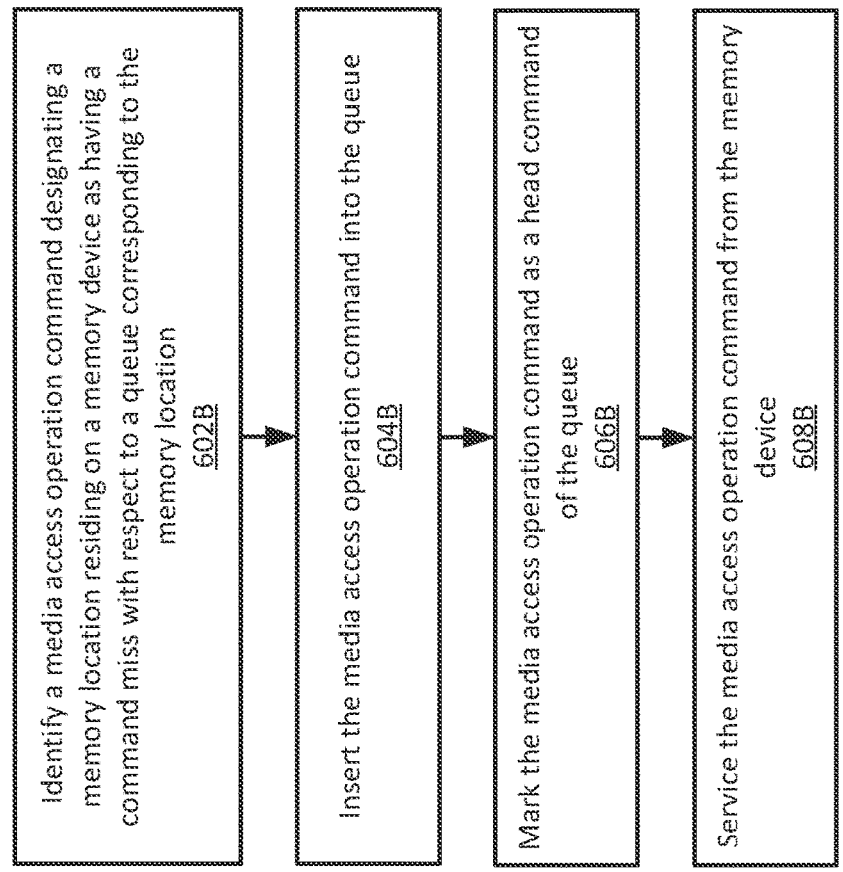

600C

- Identify a read command designating a memory location residing on a memory device as having a command hit with respect to a queue corresponding to the memory location
  602C
- Service the read command from a media buffer maintaining old read data from a previous command
  604C

- Identify a non-read type command designating a memory location residing on a memory device as having a command hit with respect to a queue corresponding to the memory location
  602D
- Insert the non-read type command into the queue
  604D
- Block the non-read type command from execution
  606D

FIG. 6D

READ-MODIFY-WRITE DATA CONSISTENCY MANAGEMENT

TECHNICAL FIELD

Embodiments of the disclosure relate generally to memory sub-systems, and more specifically, relate to read-modify-write (RMW) data consistency management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIGS. 6A-6E are flow diagrams of example methods to implement data consistency management with respect to various command types in accordance with some embodiments of the present disclosure.

DETAILED DESCRIPTION

Figure 1:
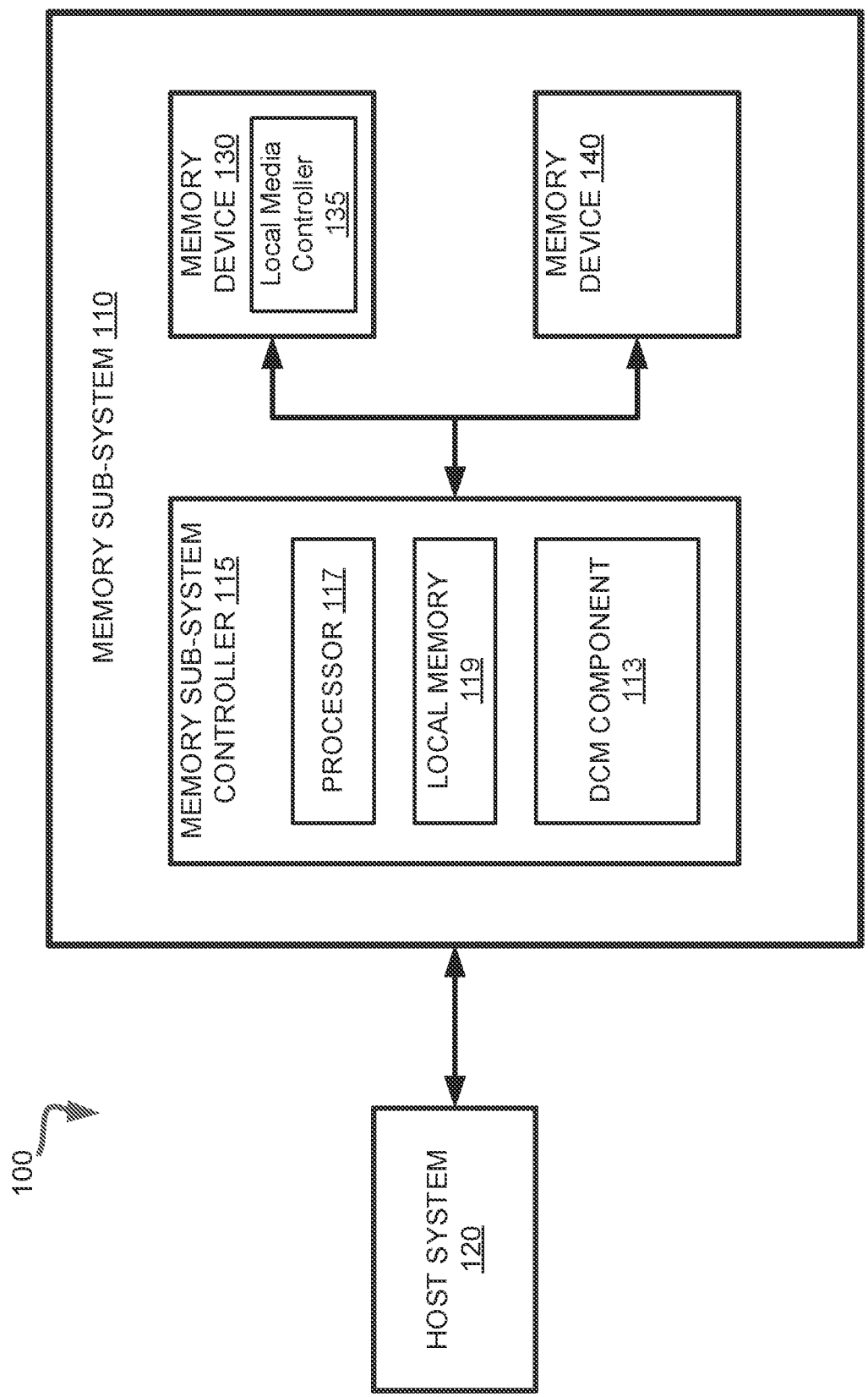
FIG. 1 illustrates an example computing system that includes a memory sub-system in accordance with some embodiments of the present disclosure.

Aspects of the present disclosure are directed to read-modify-write (RMW) data consistency management. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. A non-volatile memory device is a package of one or more dies. Each die can consist of one or more planes. For some types of non-volatile memory devices, each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A non-volatile memory device can implement a cross point memory architecture. One example of cross point memory architecture is three-dimensional cross point (3DXP) memory architecture. A 3DXP memory architecture can be byte-addressable (e.g., similar to dynamic random-access memory (DRAM)). A 3DXP memory array can include a stackable cross point architecture in which the cells are located at the intersections of row address lines (wordlines or WLs) and column address lines (bitlines or BLs) arranged in a grid. More specifically, WLs and BLs cross in the formation of the grid, and each 3DXP memory cell ("3DXP cell") can be coupled between a WL and a BL at a cross point. At the cross point, the WL and BL can be positioned at different vertical planes such that the WL crosses over the BL without physical contact. The 3DXP architecture is stackable to improve storage density, such that a WL can cross over a first BL located beneath the WL and a second BL located above the WL.

A 3DXP cell can have a high-resistance state or a low-resistance state, and changing the resistance level of the 3DXP cell changes whether the 3DXP cell is read as a 1 or a 0. Since the 3DXP cells are persistent memory cells, they can hold their values indefinitely (e.g., in the event of a power loss). Read and write operations can occur by varying the amount of voltage sent to each selector. For write operations, a first voltage can be applied to activate the selector and enable voltage through to the cell to initiate a bulk property change. For read operations, a second voltage (which can be different from the first voltage) can be applied to determine whether the 3DXP cell is in a high-resistance state or a low-resistance state. Data can be written to the 3DXP cell at a bit-level, which can be provide advantages over other non-volatile memory technology (e.g., NAND flash, in which all the bits of a block are erased before writing data to the block). Accordingly, 3DXP devices can have a better latency than, e.g., NAND flash devices, while costing less than e.g., DRAM devices.

In some implementations, a 3DXP cell can be a phase-change memory (PCM) cell. A PCM cell can store data by changing the state of a phase-change material. For example, when heated, the phase-change material can transition between two states or phases (e.g., crystalline and amorphous). One example of a phase-change material is a chalcogenide glass. PCM can enable the ability to achieve a number of distinct intermediary states, thereby having the ability to hold multiple bits in a single cell. PCM can enable a class of non-volatile memory referred to as non-volatile random-access memory (NVRAM).

Media access operations can generally be classified into respective categories, such as read operations, write operations, erase operations, etc. A memory sub-system controller can assign media access operation commands to a queue. Illustratively, the queue can be in the form of a linked list including a head and a tail, where media access operation commands are executed in a first-in, first-out (FIFO) manner. Since a media access operation command from only one of the queues may be executed at a time, the memory sub-system controller can use a sequencer to service commands identified within the queues according to a scheduling scheme.

However, certain memory devices (e.g., 3DXP memory devices) can have a characteristic in which reading data from a memory location (e.g., physical block address (PBA) corresponding to a physical block of a memory device) within a window of time (e.g., within 1 millisecond (ms)) after the data has been written to the memory location can cause a large number of data errors in the data. The number of errors can be beyond the error correction capability of error correcting code (ECC) and can cause a read failure. To address this, such memory devices can implement a delay period after a write operation is completed before servicing a host read command with respect to the same memory location. The purpose of the delay period is to ensure that data written to the memory location is correct programmed and to avoid data corruption, and thus meet performance and/or Quality of Service (QoS) requirements. Although the delay period may be needed to reduce data errors, the delay can negatively contribute to host read command latency by increasing the time it takes to retrieve data from the location and return the data back to the host system. This can be problematic as there can be strict host read command latency requirements with respect to certain memory device implementations (e.g., 3DXP memory device implementations).

A media access operation command can designate an address identifying a memory location (e.g., a management unit) on the memory device. For example, the address can be a PBA. A media controller architecture (e.g., 3DXP media controller architecture) can include a stripe command management component and a set of communication channels ("channels") that enables multi-channel communication between the media controller architecture and the memory device. The stripe command management component can handle data integrity and command order based on time of entry (e.g., a FIFO command execution scheme). Each channel of the set of channels can implement a content-addressable memory (CAM) to receive commands for a particular memory location on the memory device, and place the commands into a queue maintained on the CAM (e.g., for a FIFO command execution scheme, append a new media access operation command to the tail of the queue). Thus, each CAM can be used to ensure that media access operations commands of a particular memory location are processed in order within the corresponding channel.

Generally, read-modify-write (RMW) refers to a class of media operations that simultaneously read a memory location corresponding to an address and a write a new value to the memory location. The new value can be an entirely new value, or can be based on some function of a previous value. A stripe can include a number of management units (MU's) distributed over a plurality of dies of a memory device.

For example, assume that a stripe includes management units $MU_0$ through $MU_p$, where p is a positive integer and $MU_0$ through $MU_p$ correspond to respective channels 0 through p. At some point in time, a stripe command management component performs a stripe write operation corresponding to $MU_0$ and sends an $MU_0$ read/write (R/W) command and a first $MU_p$ R/W command to channels 0 and p, respectively. At a second point in time, the stripe command management component performs a stripe write operation corresponding to $MU_1$ and sends an $MU_1$ R/W command and a second $MU_p$ R/W command to channels 1 and p, respectively. In addition, the second point in time, the channel 0 processes the $MU_0$ R/W command and channel p processes the first $MU_p$ R/W command. At a third point in time, channel 1 processes the $MU_1$ R/W command and channel p processes the second $MU_p$ R/W command. The CAM within channel p ensures that the second $MU_p$ R/W command executes after the first $MU_p$ R/W command.

The stripe command management component can issue a read command for a given MU corresponding to a stripe. If the read command issued for the given MU results in a read failure (e.g., the given MU is a failed MU having an uncorrectable error (UECC), where an error correction code (ECC) engine is not able to correct the UECC), the stripe command management component can invoke error recovery in an attempt to recover the data for the given MU. More specifically, the stripe command management component can issue an error flow recovery (ERF) read command to read the data of other MUs of the stripe, and use the data of the other MUs of the stripe to perform the error recovery to recover the data of the failed MU. The data can include redundancy metadata associated with the stripe (e.g., XOR parity data of the stripe). Illustratively, if a stripe includes $MU_0$ through $MU_p$ as in the above example, assume that $MU_0$ has an UECC. Data of the other MU's $MU_1$ through $MU_p$ can be read, and the following equation can be used to recover the $MU_0$ data: $data(MU_0) = data(MU_1) \oplus data(MU_2) \oplus \ldots \oplus data(MU_p)$ (where $\oplus$ denotes the XOR operation).

However, during error recovery, stripe data consistency may not be guaranteed in "out-of-sync" error recovery situations. For example, the positioning of the error recovery operation within the command order flow of a queue can lead to undesirable scenarios in which it may not be possible to recover data subject to a read failure. One example of an out-of-sync situation in a memory device is where the stripe command management component issues a read command to an MU, issues a write command to the MU after issuing the read command, and then initiates an error recovery operation in response to detecting a read failure of the MU after issuing the write command. As an example of this situation, assume that a stripe command manager processes and sends an $MU_0$ read command to channel 0 at time 1. At time 2, the stripe command management component processes a full stripe write and sends $MU_0$ through $MU_p$ write commands to respective ones of the channels 0 through p, and channel 0 processes the $MU_0$ read command. At time 3, the channels 0 through p process their respective $MU_0$ through $MU_p$ write commands. At time 4, the stripe command management component receives a read failure with respect to $MU_0$, and invokes error recovery to issue an ERF read command in response to the read failure. At time 5, the channels 1 through p process the respective $MU_1$ through $MU_p$ read commands. The ERF read command issued at time 4 returns the newly written data for $MU_0$ through $MU_p$ from the write commands processed at time 3. However, in the case of $MU_0$, since data was written to $MU_0$ at time 3 before receiving the read failure at time 4, the ERF read command returns the new data written to $MU_0$ as opposed to the previously written data written to $MU_0$. Accordingly, the data returned by the ERF read command can be used to recover the new data written to $MU_0$, as opposed to the desired previously written data written to $MU_0$ that was subject to the read failure.

Aspects of the present disclosure address the above and other deficiencies by implementing a read-modify-write (RMW) data consistency management scheme. A controller can employ a number of CAMs, where each CAM maintains a queue storing identifiers for media access operations at a particular memory location (e.g., PBA) residing on a memory device. In some embodiments, the queue can be implemented by a linked list identifying the sequence of media access operation commands designating the particular memory location. The queue can have a head command corresponding to the least recent media access operation command received by the CAM for the particular memory location, and the tail corresponding to the most recent media access operation command to be received by the CAM for the particular memory location.

The delay period implemented in certain memory devices (e.g., 3DXP memory devices) after a write operation is completed can contribute to a lack of command order synchronization. If an out-of-sync situation is possible, the controller can determine how to service the command based on the type of command, as well as a status of the queue corresponding to the memory location designated by the command. For example, if the command is an ERF read command, the controller can determine whether the head command of the queue is blocked from execution, such that the head command is not being forwarded for execution (e.g., by identifying that a blocked queue status register has a value indicative of a blocked queue). If the head command is determined to be blocked from execution, this means that the head command is not currently being executed. Thus, the controller can mark the ERF read command as the new head command within the queue, and the ERF read command can be serviced from the memory device.

If the head is determined to be unblocked from execution then, in order to maintain data consistency at least with respect to the ERF read command, the controller can service the ERF read command from a media buffer to obtain the previously written ERF data designating the memory location. In general, the media buffer maintains previously written data designating the memory location, and is used to recover data in situations where the data stored on the memory device may be out-of-sync with respect to the command order. For example, if an ERF read operation is issued to obtain ERF data, but a write operation has replaced the ERF data with a new ERF data, the controller can service of the ERF read command from the media buffer to retrieve the relevant ERF data. Advantages of the present disclosure include, but are not limited to, lower cost, higher yield, and improved reliability and performance.

Advantages of the present disclosure include, but are not limited to, improved host read command latency and quality of service (QoS), improved data transaction synchronization, and reduced hardware implementation complexity.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3DXP, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a data consistency management (DCM) component 113. In some embodiments, the memory sub-system controller 115 includes at least a portion of the DCM component 113. In some embodiments, the DCM component 113 is part of the host system 110, an application, or an operating system. In other embodiments, local media controller 135 includes at least a portion of DCM component 113 and is configured to perform the functionality described herein.

The DCM component 113 can enforce data consistency for a memory device to prevent out-of-sync situations from occurring by controlling how incoming media operation commands are serviced. To do so, the DCM component 113 can manage an incoming media access operation command based on whether the error recovery result is ready. If error recovery is not ready, in order to ensure data consistency, the DCM component 113 can determine whether to service the incoming media access operation command from the memory device, or from a media buffer that maintains previously written data from a previously completed write operation. For example, in the case of error recovery being initiated for a failed MU, the DCM component 113 can prevent a situation in which the failed MU gets written to before an ERF read recovery command is issued. Further details regarding the DCM component 113 will now be described below with reference to FIG. 2.

Figure 2:
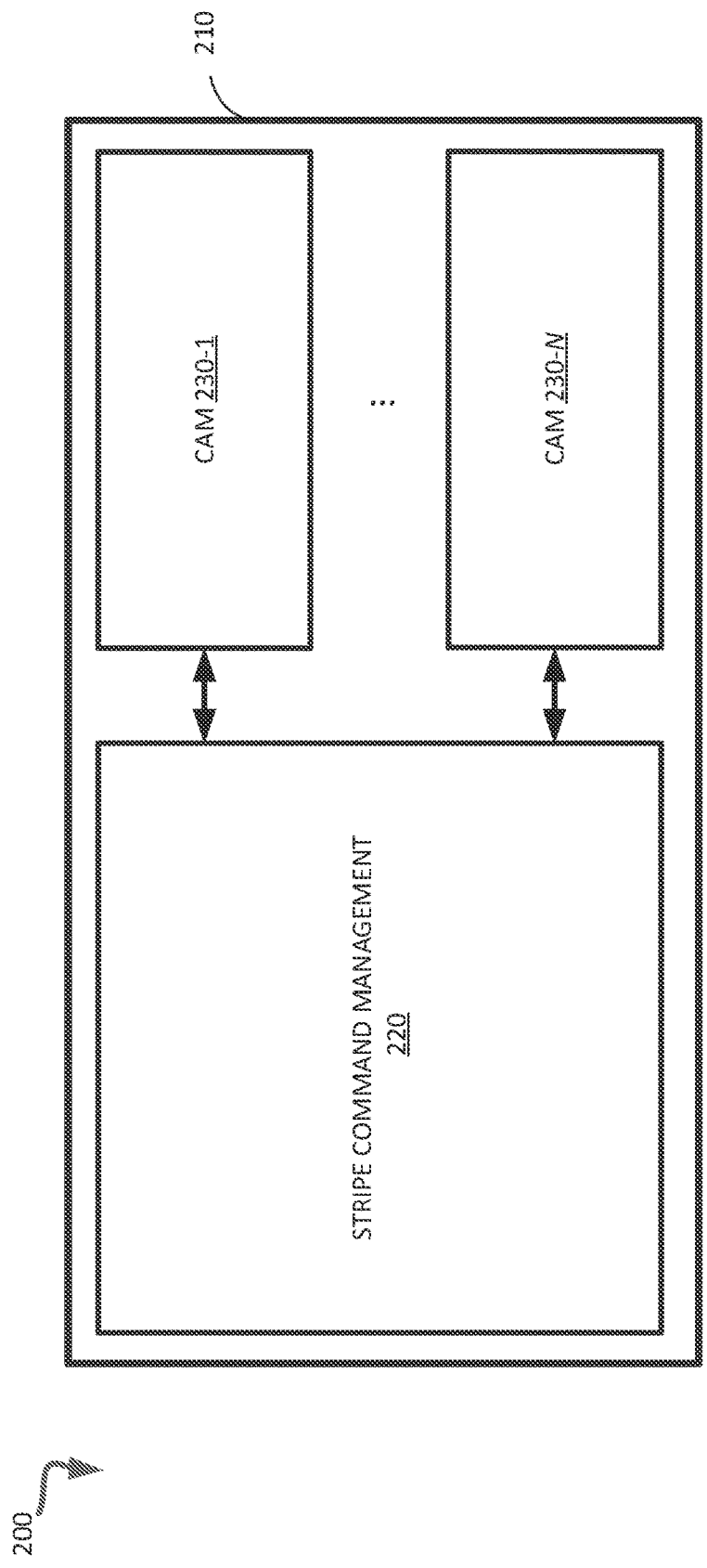
FIG. 2 is a block diagram of example system including a media access operation command management (DCM) component, in accordance with some embodiments of the present disclosure.

FIG. 2 is a block diagram of example system 200 including a data consistency management (DCM) component 210, in accordance with some embodiments of the present disclosure. The DCM component 210 can be included within a memory sub-system controller. For example, the DCM component 210 can be the same as the DCM component 113 of the memory sub-system controller 115 of FIG. 1. The DCM component 210 can be included in any suitable memory sub-system in accordance with the embodiments described herein. For example, the DCM component 210 can be included within a memory sub-system corresponding to a 3DXP memory device (e.g., the memory device 130 of FIG. 1).

As shown, the DCM component 210 can include a stripe command management component 220, and a number of CAMs 230-1 through 230-N. The stripe command management component 220 can issue stripe commands for processing by the CAMs 230-1 through 230-N to handle data integrity and command order (e.g., a FIFO command execution scheme). For example, the stripe commands can include MU commands. A stripe command issued by the stripe command management component 220 is routed to one of the CAMs 230-1 through 230-N based on the memory location designated by the stripe command. Each of the CAMS 230-1 through 230-N can maintain a queue of media access operation commands that have been issued by the stripe command management component 220, where each queue includes media access operation commands that correspond to a particular memory location (e.g., PBA). In some embodiments, each queue of media access operation commands includes a linked list of temporally ordered media access commands. Thus, the queue can be used to process commands for a particular memory location in temporal order (e.g., FIFO order). Examples of linked lists of media access operation are described below with reference to FIG. 3, and further details regarding the processes that can be performed by the DCM component 210 to implement data consistency management will be described below with reference to FIG. 4.

Figure 3:
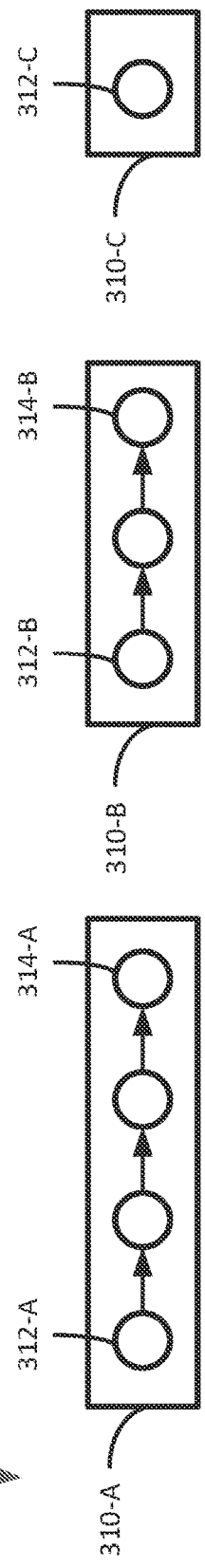
FIG. 3 is a diagram illustrating examples of queues of media access operation commands in accordance with some embodiments of the present disclosure.

FIG. 3 is a diagram 300 illustrating examples of queues of media access operation commands, in accordance with some embodiments of the present disclosure. The diagram 300 shows a first queue 310-A corresponding to a first memory location residing on a memory device (e.g., physical block address (PBA)), a second queue 310-B corresponding to a second memory location residing on the memory device, and a third queue 310-C corresponding to a third memory location residing on the memory device. The first queue 310-A includes four media access operation commands, including the head media access operation command 312-A and the tail media access operation command 314-A. The second queue 310-B includes three media access operation commands, including a head media access operation command 312-B and a tail media access operation command 312-B. The third queue 310-C includes a media access operation command 312-C, which can be both a head media access operation command and a tail media access operation command.

In some embodiments, each of the queues 310-A through 310-C is in the form of a linked list. An incoming media access operation command can be appended to the tail of the linked list (e.g., FIFO order). For example, the head media access operation commands 312-A through 312-C can correspond to the least recent media access operation commands remaining in their respective queues 310-A through 310-C, and the tail media access operation commands 314-A through 314-C can correspond to the oldest media access operation commands remaining in their respective queues 310-A through 310-C. After one of the head media access operation commands 312-A through 312-C is completed, the head media access operation command is deleted from its corresponding queue, and any next media access operation command linked to the head media access operation command becomes the new head media access operation command (if one exists). If a next media access operation command linked to the head media access operation command does not exist, such as that shown in queue 310-C with respect to the single media access operation command 312-C, then no additional media access operation commands are performed with respect to the corresponding memory location until a new media access operation command at the memory location.

Figure 4:
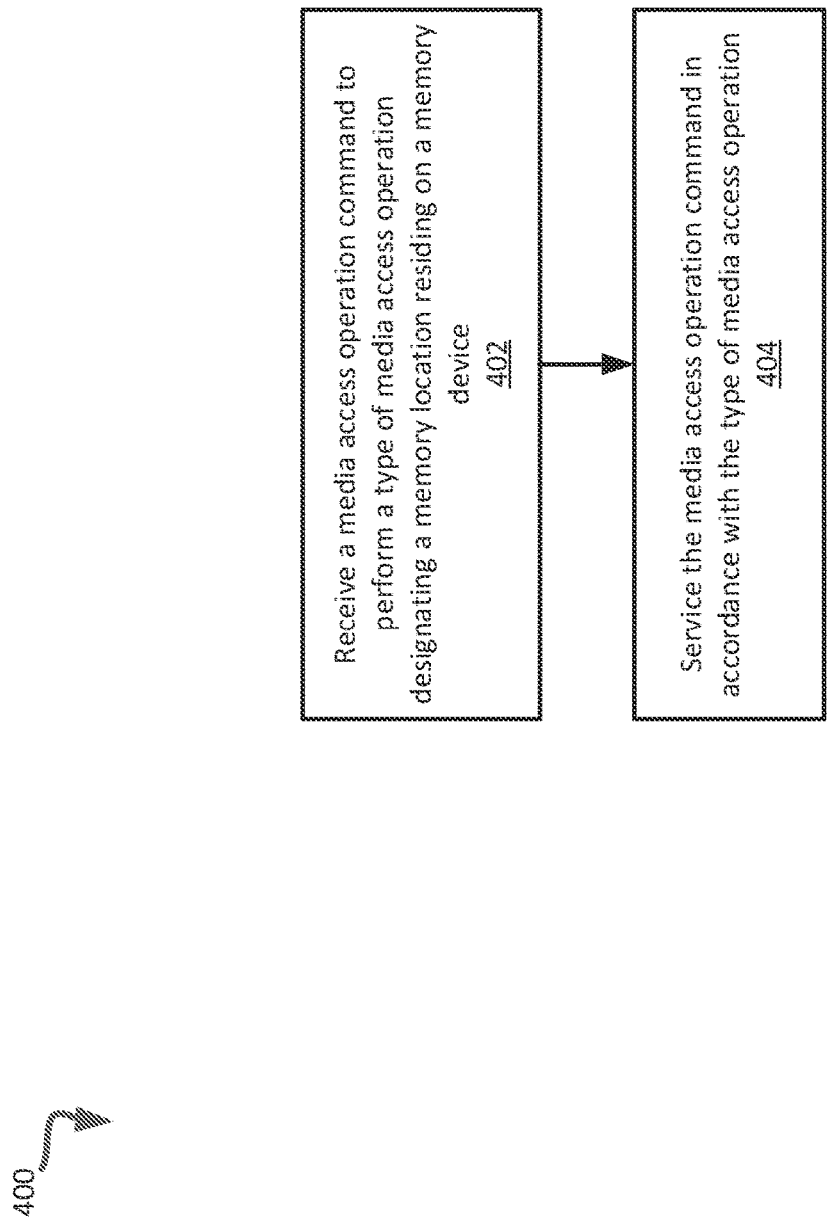
FIG. 4 is a flow diagram of an example method of implementing data consistency management in accordance with some embodiments of the present disclosure.

FIG. 4 is a flow diagram of an example method 400 of implementing data consistency management, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the DCM component 113 and 210 of FIGS. 1 and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic receives a media access operation command to perform a media access operation of a specified type. The media access command can designate a memory location residing on a memory device. At operation 404, the processing logic services the media access operation command in accordance with the type of media access operation.

The memory location can be associated with any suitable memory device. In some embodiments, the memory location is a PBA. As will be described in further detail herein, in order to maintain data consistency, instead of serving the media access operation from the memory device, the media access operation can be served by a media buffer maintaining data corresponding to the previously completed media access operation command. Further details regarding types of media access operations and servicing the types of media access operations are described below with reference to FIG. 5.

Figure 5:
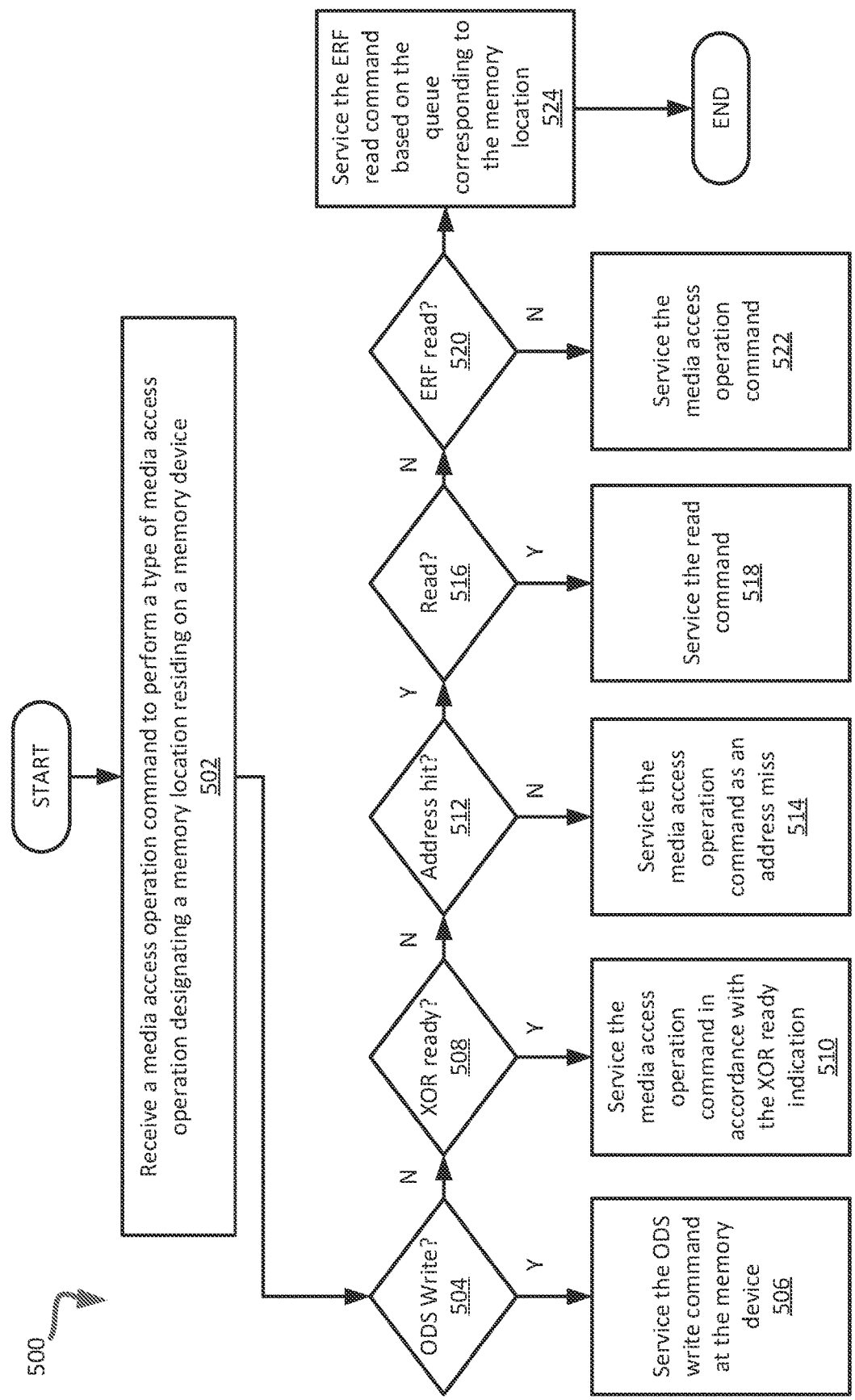
FIG. 5 is a flow diagram of an example method of implementing data consistency management in accordance with some embodiments of the present disclosure.

FIG. 5 is a flow diagram of an example method 500 of implementing data consistency management, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the DCM component 113 and 210 of FIGS. 1 and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic receives a media access operation command to perform a media access operation of a specified type. The media access command can designate a memory location residing on a memory device. The memory location can be associated with any suitable memory device. For example, the memory location can be a PBA.

At operation 504, the processing logic determines whether the media access operation command is an ODS write command. If so, the processing logic at operation 506 services that ODS write command at the memory device. If the media access operation command is not an ODS write command, at operation 508, the processing logic determines whether XOR ready is indicated. XOR indicates synchronization of media access operations being performed. For example, the synchronization can be with respect to channel writes of a 3DXP memory device. If XOR ready is indicated, then the processing logic at operation 510 services the media access operation command in accordance with the XOR ready indication. Further details regarding operation 510 will be described below with reference to FIG. 6A.

If XOR ready is not indicated, this means that there may be a lack of media access operation synchronization. To address this potential out-of-sync situation, the processing logic at operation 512 can determine whether there is a hit within the queue corresponding to the memory location designated by the media access operation command. A hit can be determined if the queue identifies a command that is ready for execution. The queue can be maintained by a CAM, as described above. If the processing logic does not determine that there is a hit (a miss) by determining that the queue fails to identify a command that is ready for execution, then the processing logic can proceed to service the media access operation command as a miss at operation 514. Further details regarding operation 514 will be described below with reference to FIG. 6B.

If the processing logic determines that there is a hit, further analysis into the type of media access operation is performed to determine how to service the media access operation command. At operation 516, the processing logic can determine whether the media access operation command is a read command. If so, then the processing logic can service the read command at operation 518. Further details regarding operation 518 will be described below with reference to FIG. 6C.

If the media access operation command is not a read command, then the processing logic determines whether the media access operation command is an ERF read command at operation 520. If not, this means that the media access operation command is not an ODS write command, a read command or an ERF read command (e.g., a write command, a forced read command, or a refresh hit command). The processing logic can service the media access operation command at operation 522. Further details regarding operation 522 will be described below with reference to FIG. 6D.

If the processing logic determines that the media access operation command is an ERF read command, then the processing logic can service the ERF read command based on the queue corresponding to the memory location. More specifically, the processing logic can determine a blocking status of the head command of the queue that indicates whether the queue is blocked or unblocked, and can control how the ERF read command is serviced based on the blocking status. Further details regarding operation 524 will be described below with reference to FIG. 6E.

FIGS. 6A-6E are flow diagrams of example methods 600A-600E to implement data consistency management with respect to various command types in accordance with some embodiments of the present disclosure. The methods 600A-600E can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 600A-600E are performed by the DCM component 113 and 210 of FIGS. 1 and 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6A:
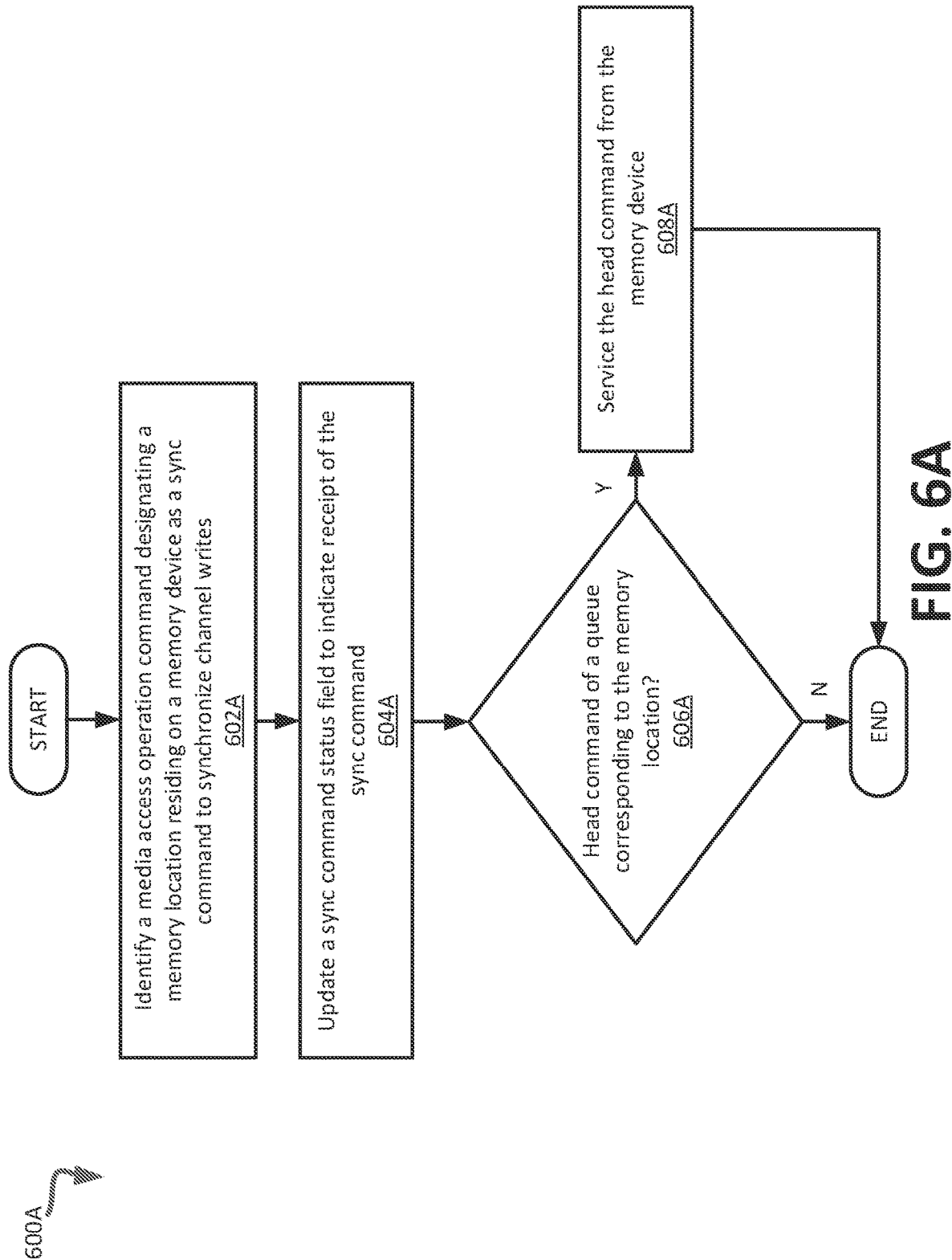

With respect to FIG. 6A, at operation 602A, the processing logic identifies a media access operation command designating a memory location residing on a memory device as a synchronization ("sync") command to synchronize channel writes. For example, the sync command can be an XOR_ready command. However, such an example should not be considered limiting.

At operation 604A, the processing logic updates a sync command status field to indicate receipt of the sync command. More specifically, the status field can be maintained by a CAM corresponding to the memory location. For example, the status field can be set to a value of 1.

At operation 606A, the processing logic determines whether a head command of a queue corresponding to the memory location exists. The queue can be maintained in the CAM. If not, the process ends. Otherwise, the processing logic services the head command from the memory device at operation 608A. Servicing the head command can include unblocking the head command (e.g., by updating a head command status field in the CAM to a value of 0), and forwarding the head command to the memory device for execution.

With respect to FIG. 6B, at operation 602B, the processing logic identifies a media access operation command designating a memory location residing on a memory device as a having a miss with respect to a queue corresponding to the memory location. More specifically, the processing logic determines that the queue fails to identify a command that is ready for execution. The media access operation command can correspond to any type of media access operation (e.g., read, write, forced read, refresh, ERF).

At operation 604B, the processing logic inserts the media access operation command into the queue. At operation 606B, the processing logic, marks the media access operation command as a head command of the queue. At operation 608B, the processing logic services the media access operation command from the memory device. Serving the media access operation command on the memory device can include forwarding the command as head of the queue for execution on the memory device.

With respect to FIG. 6C, at operation 602C, the processing logic identifies a read command designating a memory location residing on a memory device as having a hit with respect to a queue corresponding to the memory location. More specifically, the processing logic determines that the queue identifies a command that is ready for execution. The queue can be maintained in a CAM.

At operation 604C, the processing logic services the read command from a media buffer maintaining old read data from a previous command (e.g., a command identified by a tail end of the queue). That is, the read command is not inserted into the queue. The media buffer holds data from a previously completed write operation designating the memory location, and can thus serve the read command in a way that reduces negative delay period impact and improves data consistency.

With respect to FIG. 6D, at operation 602D, the processing logic identifies a non-read type command designating a memory location residing on a memory device as having a hit with respect to a queue corresponding to the memory location. The queue can be maintained in a CAM. More specifically, the processing logic determines that the queue identifies a command that is ready for execution. Examples of non-read type commands include a write command, a forced read command, a refresh command, etc.

At operation 604D, the processing logic inserts the non-read type command into the queue. At operation 606D, the processing logic blocks the non-read type command from execution. For example, the processing logic can update a block status for the non-read type command within the command (e.g., update to a value of "1").

Figure 6E:
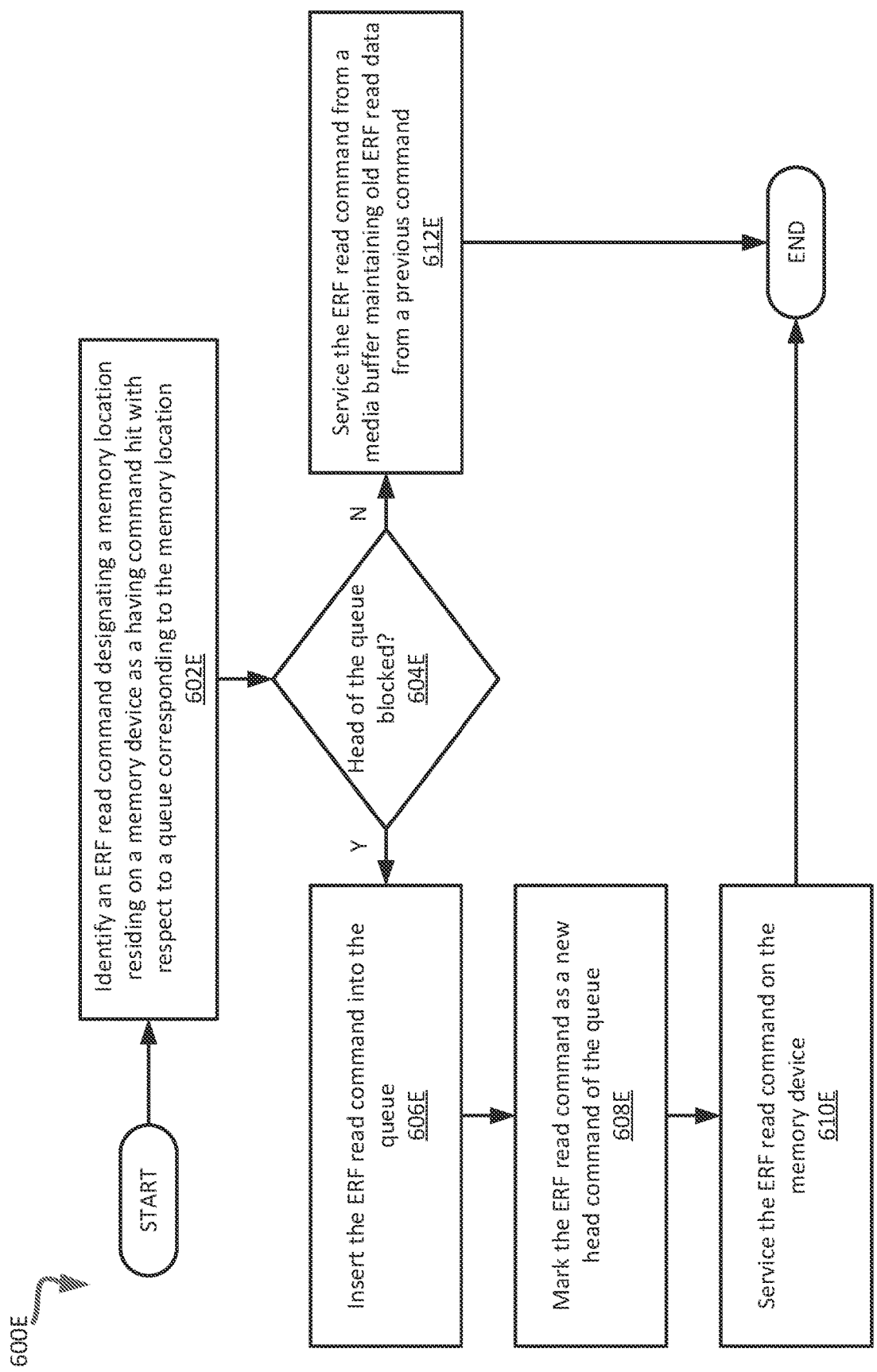

With respect to FIG. 6E, at operation 602E, the processing logic identifies an ERF read command designating a memory location residing on a memory device as having a hit with respect to a queue corresponding to the memory location. The queue can be maintained in a CAM. For example, the ERF read command can be a stripe-level ERF read command. As mentioned above, the ERF read command is used to return newly written data (e.g., newly written data from each of the MU channels). More specifically, the processing logic determines that the queue identifies a command that is ready for execution. Examples of non-read type commands include a write command, a forced read command, a refresh command, etc.

At operation 604E, the processing logic determines whether a head command of the queue is blocked from execution. For example, the head command can be a write command. The determination is made in order to determine how to handle the ERF read command in a way that maintains data consistency.

If the head command of the queue is blocked from execution, this means that the head command is not currently being executed. Thus, the processing logic can insert the ERF read command into the queue at operation 606E, mark the ERF read command as a new head command of the queue at operation 608E, and service the ERF read command from the memory device at operation 610E. Marking the ERF read command as the new head command of the queue can include remarking the previous head command in the queue (e.g., in a position next to the ERF read command). Servicing the ERF read command from the memory device can include forwarding the ERF read command to the memory device for execution.

Otherwise, if the head command is determined to be unblocked from execution at operation 604E, this means that the head command (e.g., write command) is currently being executed. Thus, to avoid inconsistency with respect to the data being written by the currently executed head command, the processing logic at operation 612E services the ERF from a media buffer maintaining previously written ERF read data from a previous command. Servicing the ERF read command from the media buffer can include forwarding the ERF read command to the media buffer for execution. That is, the ERF read command is not inserted into the queue for servicing by the memory device. By doing so, data consistency can be maintained by not recovering newly written data from the memory device.

Figure 7A:
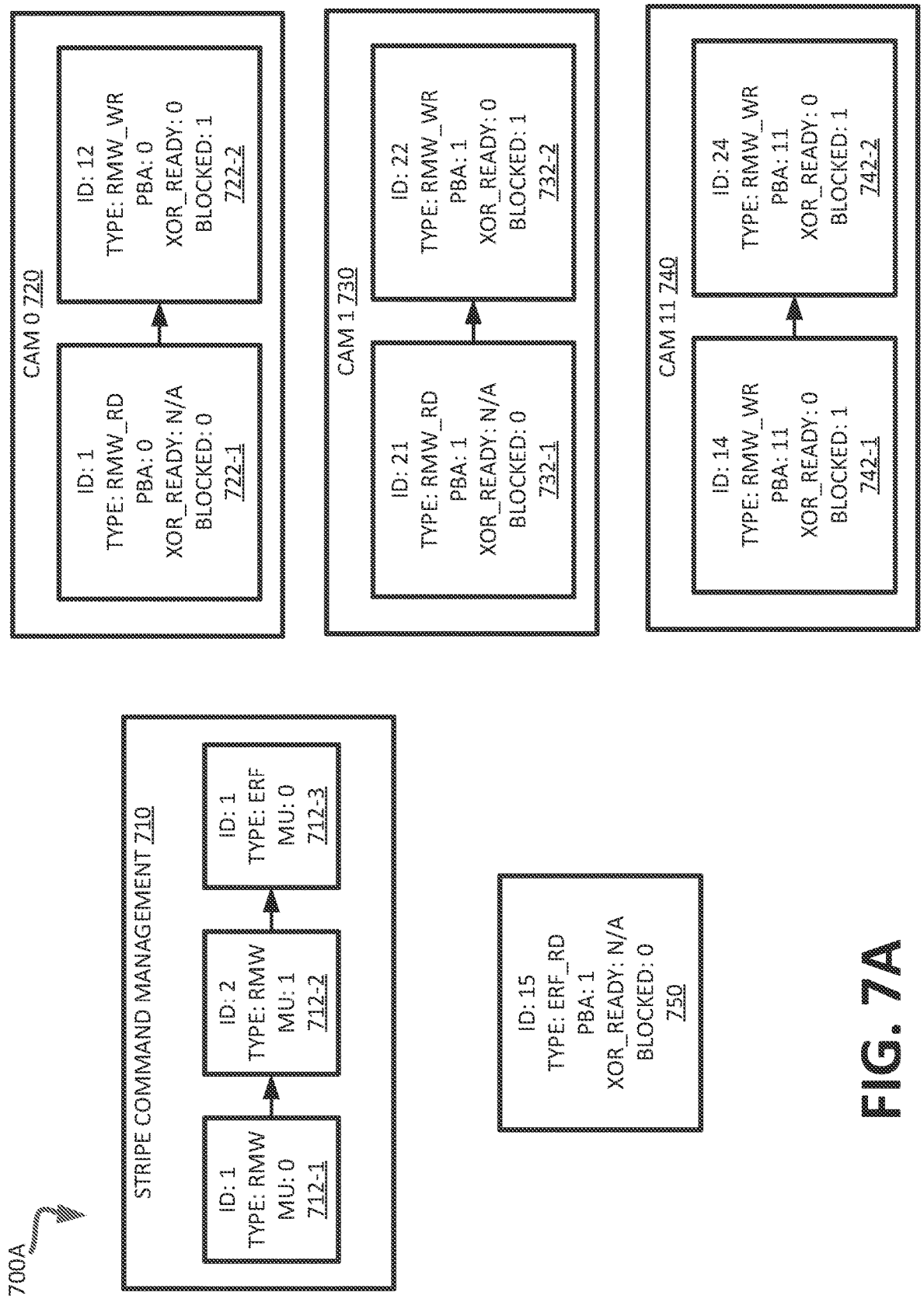
FIGS. 7A-7B are diagrams illustrating examples of stripe command processing in accordance with some embodiments of the present disclosure.
Figure 7B:
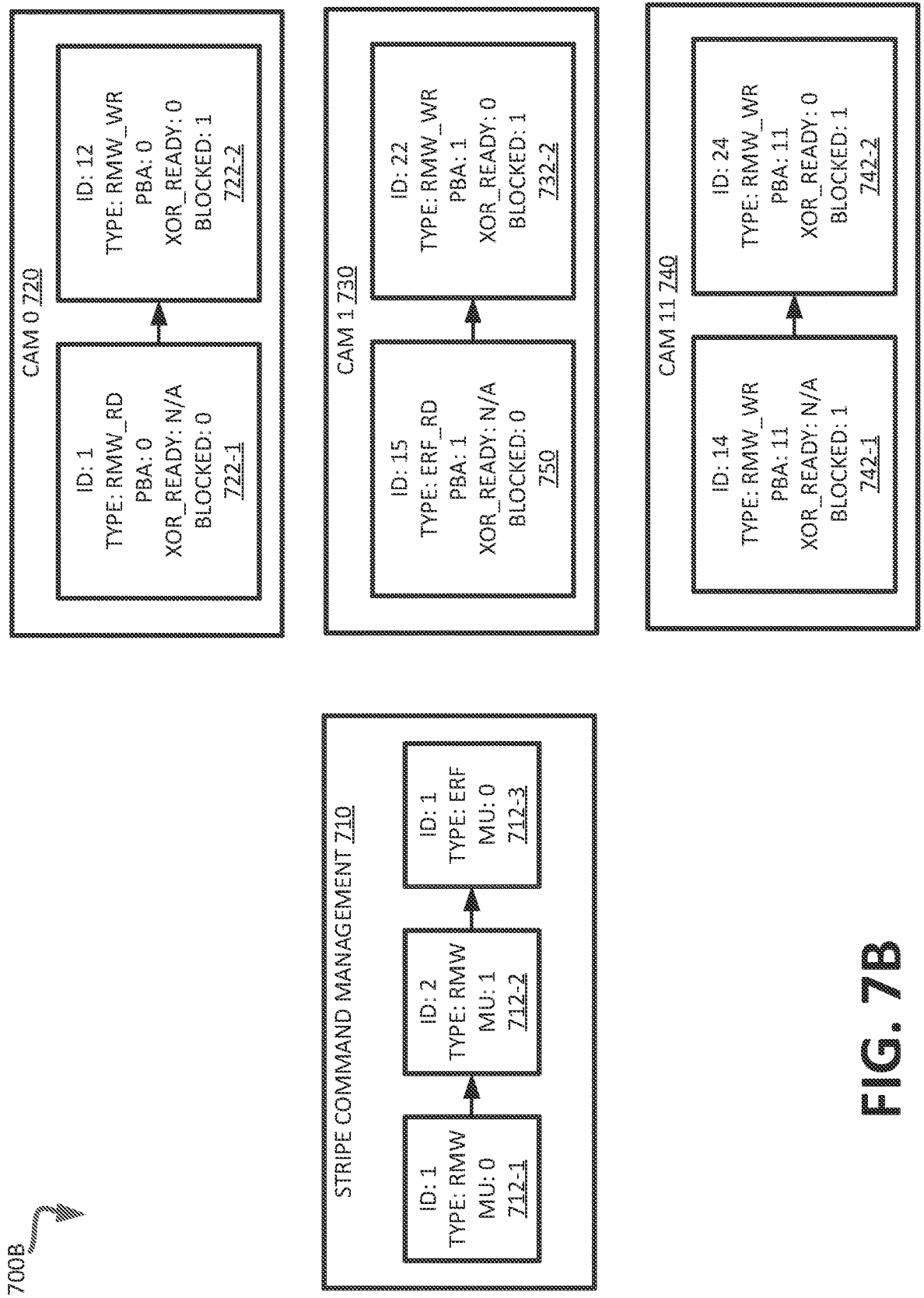

FIGS. 7A-7B are diagrams 700A and 700B illustrating examples of stripe command processing in accordance with some embodiments of the present disclosure. More specifically, diagrams 700A and 700B illustrate order stripe command order processing with respect to a first RMW command, a second RMW command, and an ERF read command.

Diagrams 700A and 700B show a stripe command management component 710 that includes a queue identifying a set of commands to be issued, and a number of CAMs corresponding to MUs, including CAM 0 720 corresponding to $MU_0$, CAM 1 730 corresponding to $MU_1$ and CAM 11 740 corresponding to $MU_{11}$. The number of CAMs shown should be not considered limiting. Each of the CAMs maintains a queue identifying a set of commands to be executed with respect to a memory location. In this example, the memory location is indicated as a PBA. For example, the CAM 0 720 corresponds to $PBA_0$, CAM 1 730 corresponds to $PBA_1$ and CAM 11 740 corresponds to $PBA_{11}$.

In both FIGS. 7A and 7B, the commands of stripe command management component 710 include commands 712-1 through 712-3. Command 712-1 is a first RMW command designating $PBA_0$, command 712-2 is a second RMW command designating $PBA_1$, and command 712-3 is an ERF read command designating $PBA_0$. Command 712-1 has an identifier (ID) of 1, a type of RMW, and is issued to $MU_0$. Command 712-2 has ID of 2, a type of RMW, and is issued to $MU_1$. Command 712-1 has an ID of 1, a type of ERF, and is also issued to $MU_0$. It is assumed that a read failure exists at $PBA_0$.

With reference to FIG. 7A, the CAM 0 720 includes a queue identifying commands 722-1 and 722-2. Command 722-1 is an unblocked RMW read (RMW_RD) command having an ID of 1 and XOR_ready is not applicable (N/A), and command 722-2 is a blocked RMW write (RMW_WR) command having an ID of 12 in which the XOR_ready status is set to "0".

The CAM 1 730 includes a queue identifying commands 732-1 and 732-2. Command 732-1 is an unblocked RMW_RD command having an ID of 21 and XOR_ready is not applicable (N/A), and command 732-2 is a blocked RMW_WR command having an ID of 22 in which the XOR_ready status is set to "0".

The CAM 11 740 includes a queue identifying commands 742-1 and 742-2. Since no command has been issued to CAM 11 740, command 742-1 is a blocked RMW_WR command having an ID of 14, and command 742-2 is a blocked RMW_WR command having an ID of 24. The XOR_ready status is set to "0" for both commands 742-1 and 742-2.

In FIG. 7A, command 712-2 is still executing, which is why the head command 732-1 of the queue of CAM 1 730 is unblocked. Thus, to retrieve the previously written ERF data corresponding to $PBA_1$ in order to satisfy the ERF read command 712-3 issued by the stripe command management component 710, an ERF read command 750 to retrieve ERF data for $PBA_1$ is not inserted into the queue, but is instead forwarded directly to a media buffer that maintains the previously written ERF data corresponding to $PBA_1$. However, in FIG. 7B, it is assumed that the RMW_RD corresponding to command 712-2 has finished executing, and thus the head command 732-1 shown in FIG. 7A is blocked (Blocked: 1). Thus, to return the previous written ERF data, the ERF read command 750 can be inserted into the head command of the queue of CAM 1 730 to be serviced from the memory device, as opposed to being serviced from the media buffer.

Figure 8A:
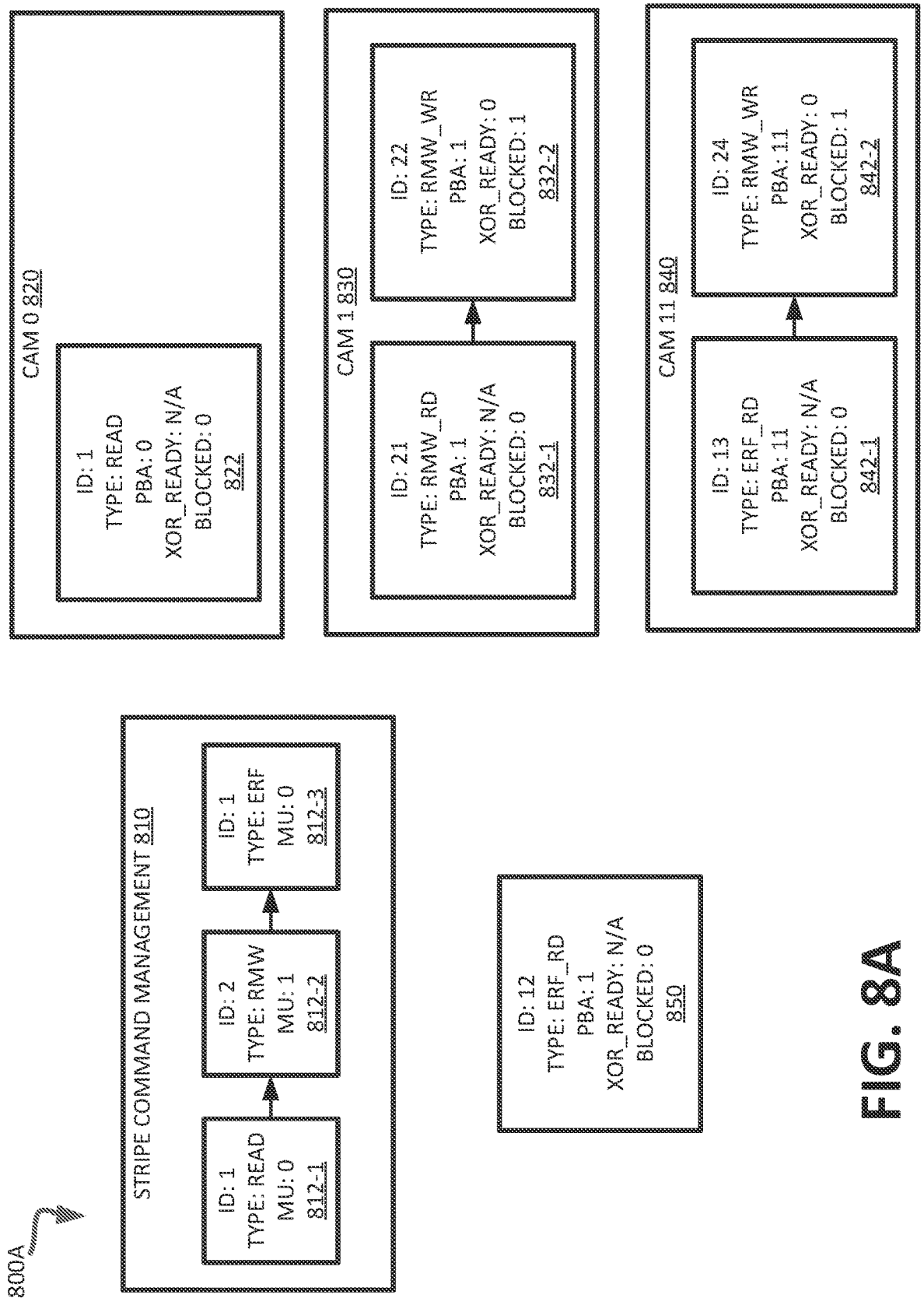
FIGS. 8A-8B are diagrams illustrating examples of stripe command processing in accordance with some embodiments of the present disclosure.
Figure 8B:
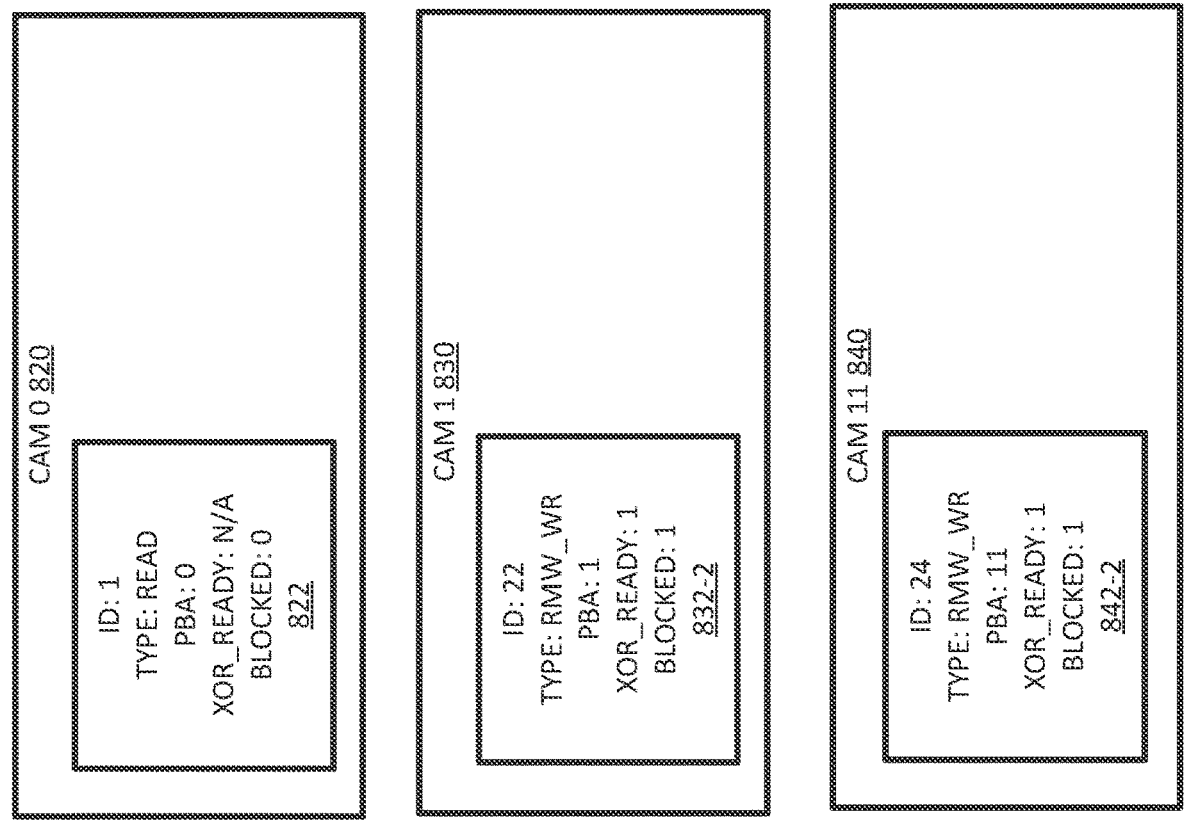
Figure 8B:
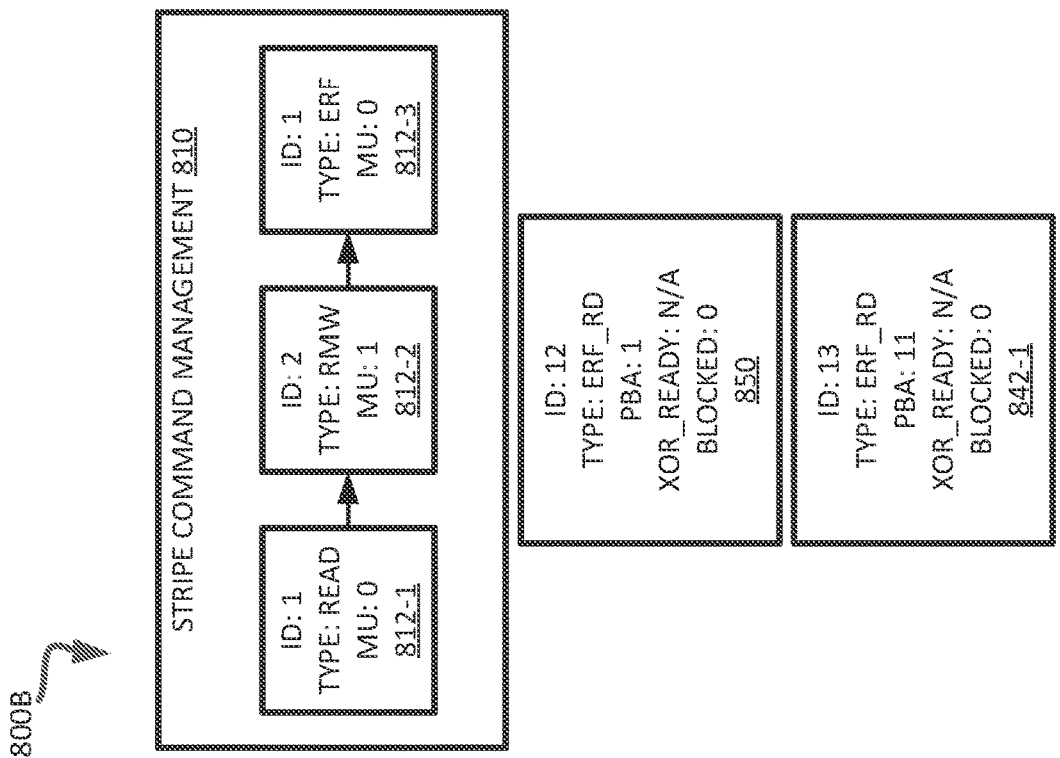

FIGS. 8A-8B are diagrams 800A and 800B illustrating examples of stripe command processing in accordance with some embodiments of the present disclosure. More specifically, diagrams 800A and 800B illustrate order stripe command order processing with respect to a read command, a RMW command, and an ERF read command.

Diagrams 800A and 800B show a stripe command management component 810 that includes a queue identifying a set of commands to be issued, and a number of CAMs corresponding to MUs, including CAM 0 820 corresponding to $MU_0$, CAM 1 830 corresponding to $MU_1$ and CAM 11 840 corresponding to $MU_{11}$. The number of CAMs shown should be not considered limiting. Each of the CAMs maintains a queue identifying a set of commands to be executed with respect to a memory location. In this example, the memory location is indicated as a PBA. For example, the CAM 0 820 corresponds to $PBA_0$, CAM 1 830 corresponds to $PBA_1$ and CAM 11 840 corresponds to $PBA_{11}$.

In both FIGS. 8A and 8B, the commands of stripe command management component 810 include commands 812-1 through 812-3. Command 812-1 is a read command designating $PBA_0$, command 812-2 is a RMW command designating $PBA_1$, and command 812-3 is an ERF read command designating $PBA_0$. Command 812-1 has an identifier (ID) of 1, a type of read, and is issued to $MU_0$. Command 812-2 has ID of 2, a type of RMW, and is issued to $MU_1$. Command 812-1 has an ID of 1, a type of ERF, and is also issued to $MU_0$. Similar to FIGS. 7A and 7B, it is assumed that a read failure exists at $PBA_0$.

With reference to FIG. 8A, the CAM 0 820 includes a queue identifying command 822. Command 822 is an unblocked read command having an ID of 1, and XOR_ready is not applicable (N/A). The CAM 1 830 includes a queue identifying commands 832-1 and 832-2. Command 832-1 is an unblocked RMW_RD command having an ID of 21 and XOR_ready is not application (N/A), and command 832-2 is a blocked RMW_WR command having an ID of 22 in which the XOR_ready status is set to "0". The CAM 11 840 includes a queue identifying commands 842-1 and 842-2. Command 842-1 is an unblocked ERF read command (ERF_RD) having an ID of 13 and XOR_ready is not applicable (N/A), and command 842-2 is a blocked RMW_WR command having an ID of 24 in which the XOR_ready status is set to "0".

In FIG. 8A, not all of the RMW_RD commands have been completed, and thus the RMW commands 812-1 and 812-2 are out-of-sync (which is why the XOR_ready status is set to 0). Thus, to retrieve the previously written ERF data corresponding to $PBA_1$ in order to satisfy the ERF read command 812-3 issued by the stripe command management component 810, the ERF read command 850 to retrieve ERF data for $PBA_1$ can be forwarded directly to a media buffer that maintains the previously written ERF data corresponding to $PBA_1$, while the ERF command 842-1 is or forwarded for immediate execution at the memory device.

However, in FIG. 8B, it is assumed that both of the RMW_RD commands have finished executing, and the XOR_ready status for the RMW_WR commands 832-2 and 842-2 are updated to "1" and the commands 832-2 and 842-2 become blocked from execution (BLOCKED: 1). Here, since the RMW commands 812-1 and 812-2 are synchronized such that an out-of-sync situation does not exist with respect to the RMW commands 812-1 and 812-2, the ERF read commands 850 and 842-1 can be serviced from the memory device, as opposed to the media buffer.

Figure 9:
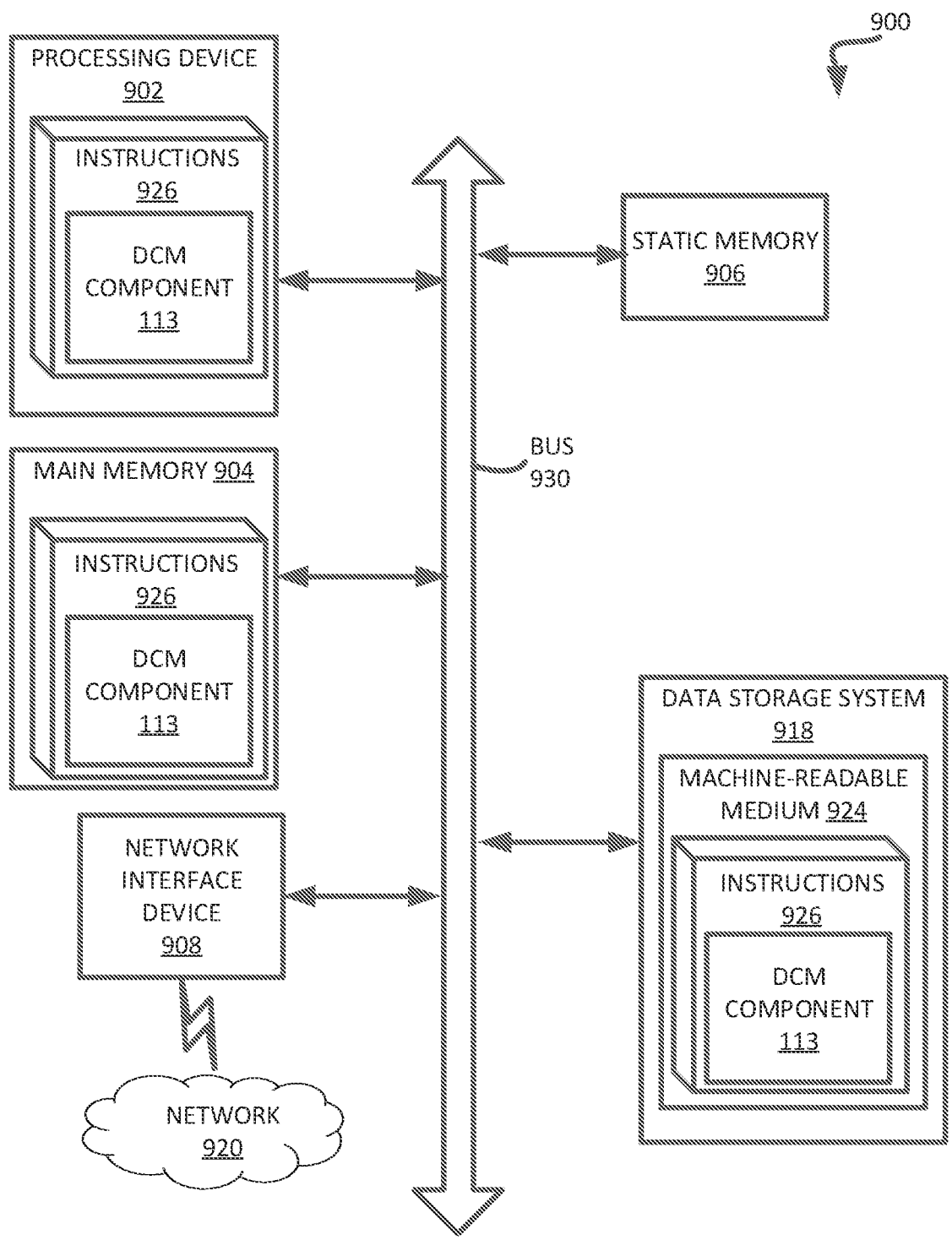
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the DCM component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or RDRAM, etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 804 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a DCM component (e.g., the DCM component 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a first memory location and a second memory location; and
a processing device, operatively coupled with the memory device, to perform operations comprising:
receiving a media access operation command designating the first memory location;
determining whether at least a first media access operation command designating the first memory location and a second media access operation command designating the second memory location are synchronized, wherein the first media access operation command is identified by a first queue corresponding to the first memory location, and wherein the second media access operation command is identified by a second queue corresponding to the second memory location;
in response to determining that the first and second media access operation commands are not synchronized, determining that the media access operation command is an error flow recovery (ERF) read command to recover, for a management unit of a plurality of management units of a stripe, data determined to have an uncorrectable error by reading data of other management units of the plurality of management units;

in response to determining that the media access operation command is an ERF read command, determining whether a head command of the first queue is blocked from execution, wherein the head command is a write command; and in response to determining that the head command is unblocked from execution, servicing the ERF read command from a media buffer maintaining previously written ERF data.

2. The system of claim 1, wherein the memory device comprises a three-dimensional cross-point memory device.

3. The system of claim 1, wherein the first memory location and the second memory location each comprise a physical block address (PBA).

4. The system of claim 1, wherein the first queue and the second queue are each implemented by a respective linked list identifying a respective set of media access operation commands.

5. The system of claim 1, wherein the first queue and the second queue are each maintained in respective first content-addressable memory and second content-addressable memory.

6. The system of claim 1, wherein the operations further comprise:
in response to determining that head command is blocked from execution, inserting the ERF read command into a head of the first queue; and
servicing, from the memory device, the ERF read command identified by the head of the first queue.

7. The system of claim 1, wherein the first media access operation command and the second media access operation command are read-modify-write (RMW) operation commands.

8. The system of claim 1, wherein the first media access operation command is a read operation command and the second media access operation command is a read-modify-write (RMW) operation command.

9. A method comprising:
receiving, by a processing device, a media access operation command designating a first memory location residing on a memory device;
determining, by the processing device, whether at least a first media access operation command designating the first memory location and a second media access operation command designating a second memory location residing on the memory device are synchronized, wherein the first media access operation command is identified by a first queue corresponding to the first memory location, and wherein the second media access operation command is identified by a second queue corresponding to the second memory location;
in response to determining that the first and second media access operation commands are not synchronized, determining, by the processing device, that the media access operation command is an error flow recovery (ERF) read command to recover, for a management unit of a plurality of management units of a stripe, data determined to have an uncorrectable error by reading data of other management units of the plurality of management units;
in response to determining that the media access operation command is an ERF read command, determining, by the processing device, whether a head command of the first queue is blocked from execution, wherein the head command is a write command; and
in response to determining that the head command is unblocked from execution, servicing, by the processing device, the ERF read command from a media buffer maintaining previously written ERF data.

10. The method of claim 9, wherein the memory device comprises a three-dimensional cross-point memory device, and wherein the first memory location and the second memory location each comprise a physical block address (PBA).

11. The method of claim 9, wherein the first queue and the second queue are each implemented by a respective linked list identifying a respective set of media access operation commands.

12. The method of claim 9, wherein the first queue and the second queue are each maintained in respective first content-addressable memory and second content-addressable memory.

13. The method of claim 9, further comprising:
in response to determining that head command is blocked from execution, inserting, by the processing device, the ERF read command into a head of the first queue; and
servicing, by the processing device from the memory device, the ERF read command identified by the head of the first queue.

14. The method of claim 9, wherein the first media access operation command and the second media access operation command are read-modify-write (RMW) operation commands.

15. The method of claim 9, wherein the first media access operation command is a read operation command and the second media access operation command is a read-modify-write (RMW) operation command.

16. A system comprising:
a memory device comprising a first memory location and a second memory location;
a first content-addressable memory maintaining a first queue corresponding to the first memory location;
a second content-addressable memory maintaining a second queue corresponding to the second memory location, wherein the first queue and the second queue are each implemented by a respective linked list identifying a respective set of media access operation commands; and
a processing device, operatively coupled to the memory device, to perform operations comprising:
receiving an error flow recovery (ERF) read command designating a first memory location to recover, for a management unit of a plurality of management units of a stripe, data determined to have an uncorrectable error by reading data of other management units of the plurality of management units;
determining whether XOR ready is indicated;
upon determining that XOR ready is not indicated, determining whether a head command of the first queue is blocked from execution, wherein the head command is a write command; and
in response to determining that the head command is blocked from execution, servicing the ERF read command from the memory device.

17. The system of claim 16, wherein the memory device comprises a three-dimensional cross-point memory device, and wherein the first memory location and the second memory location each comprise a physical block address (PBA).

18. The system of claim 16, wherein the operations further comprise:

in response to determining that head command is unblocked from execution, servicing the ERF read command from a media buffer maintaining previously written ERF data.

19. The system of claim 16, wherein a first media access operation command designating the first memory location and a second media access operation command designating the second memory location are read-modify-write (RMW) operation commands.

20. The system of claim 16, wherein a first media access operation command designating the first memory location is a read operation command and a second media access operation is a read-modify-write (RMW) operation command.

* * * * *